US007462252B2

(12) United States Patent
Schaller et al.

(10) Patent No.: US 7,462,252 B2
(45) Date of Patent: Dec. 9, 2008

(54) LABEL APPLICATOR WITH SINGLE AIR CYLINDER ACTUATOR AND SPRING-LOADED HINGED PAD

(75) Inventors: Adam Lee Schaller, Carbondale, PA (US); David Allen DeLuca, Shippensburg, PA (US); James Joseph Masgula, Waymart, PA (US); Jason Allen MacDonald, Scranton, PA (US)

(73) Assignee: Illininois Tool Works Inc., Glenview, IL (US)

(*) Notice: Subject to any disclaimer, the term of this patent is extended or adjusted under 35 U.S.C. 154(b) by 0 days.

(21) Appl. No.: 10/872,377

(22) Filed: Jun. 22, 2004

(65) Prior Publication Data

US 2005/0279440 A1 Dec. 22, 2005

(51) Int. Cl.
*B32B 41/00* (2006.01)

(52) U.S. Cl. ......................... 156/64; 156/202; 156/227; 156/361; 156/468

(58) Field of Classification Search ................. 156/202, 156/285, 468, 487, 522, 530, 286, 295, 381, 156/382, 384, 538, 539, 391, 227, 212, 249, 156/269, 299, 350, 351, 361, 362, 363
See application file for complete search history.

(56) References Cited

U.S. PATENT DOCUMENTS

| | | | | |
|---|---|---|---|---|
| 1,536,837 | A * | 5/1925 | Fredsell | 156/490 |
| 2,834,168 | A * | 5/1958 | Lopez | 53/136.4 |
| 3,238,080 | A | 3/1966 | Schluter | |
| 3,461,020 | A * | 8/1969 | Loveland et al. | 156/468 |
| 4,210,484 | A * | 7/1980 | Crankshaw et al. | 156/542 |
| 4,227,955 | A * | 10/1980 | Woods et al. | 156/269 |
| 4,238,270 | A * | 12/1980 | Warshaw et al. | 156/468 |
| 4,844,771 | A | 7/1989 | Crankshaw et al. | |
| 5,300,181 | A * | 4/1994 | Yamaguchi | 156/542 |
| 5,356,508 | A * | 10/1994 | Watanabe | 156/566 |
| 5,421,948 | A | 6/1995 | Crankshaw et al. | |
| 5,645,669 | A | 7/1997 | Crankshaw et al. | |
| 5,730,827 | A * | 3/1998 | Sewell | 156/269 |
| 5,785,798 | A | 7/1998 | Horsman et al. | |
| 5,988,251 | A | 11/1999 | Hunt et al. | |
| 6,537,406 | B1 * | 3/2003 | Jensen et al. | 156/202 |
| 6,615,106 | B2 | 9/2003 | Soto et al. | |

* cited by examiner

*Primary Examiner*—George R Koch, III
(74) *Attorney, Agent, or Firm*—Law Offices of Steven W. Weinrieb

(57) ABSTRACT

Apparatus for applying labels to an article being conveyed along an article conveyor path comprises first and second label applicator pad members hingedly connected together, and a single air cylinder actuator, comprising a piston rod fixedly connected to the first label applicator pad member, which is movable between a RETRACTED position and an EXTENDED position. An applicator roller is disposed upon the second movable label applicator pad member, and in accordance with the label application mode of operation, the applicator roller adheres a downstream half-end portion of a label onto a side face of the carton, wraps the label around a trailing end corner region of the carton, and applies an upstream half-end portion of the label onto the trailing end face of the carton when the piston rod is moved to the EXTENDED position while the article is being conveyed past the label applicator pad members by the article conveyor.

25 Claims, 7 Drawing Sheets

58
16
66
68
10
18
112
116
32
118
30
28
34
36
38
48
12
26
DOM

LABEL APPLICATOR WITH SINGLE AIR CYLINDER ACTUATOR AND SPRING-LOADED HINGED PAD

FIELD OF THE INVENTION

The present invention relates generally to apparatus or an implement or component system for applying labels to packages, boxes, cartons, or the like, which are being conveyed along a predetermined conveyor path by means of a suitable conveyor mechanism, and more particularly to a new and improved apparatus or an implement or component system for applying labels to packages, boxes, cartons, or the like, which are being conveyed along a predetermined conveyor path by means of a suitable conveyor mechanism, wherein the apparatus or implement or component system comprises a single air cylinder actuator assembly, comprising a piston rod which is movable between a RETRACTED position and an EXTENDED position, a split or dual label applicator pad assembly comprising a first label applicator pad fixedly mounted upon the free or distal end portion of the piston rod of the single air cylinder actuator, a second label applicator pad pivotally mounted upon the first fixed label applicator pad by means of a suitable hinge mechanism, and a plurality of torsion springs which effectively maintain the second movable label applicator pad disposed at or biased toward an undeflected HOME position at which the second movable label applicator pad is disposed in a substantially coplanar manner with respect to the first fixed label applicator pad so as to effectively apply, for example, an upstream half-end portion of a label onto a side face of a package, carton, box, or the like, and which permit the second movable label applicator pad to be pivotally moved away from the HOME position to any one of several deflected APPLICATION positions so as to enable the second movable label applicator pad, having an applicator roller mounted thereon, to effectively wrap a downstream half-end portion of the label around a trailing corner region of the package, carton, box, or the like, and onto a trailing end face of the package, carton, box, or the like, all in accordance with a combination tamp/touch-contact and a slidable/wipe-on application mode of operation which is conducted in conjunction with the extension of the piston rod of the single air cylinder actuator from its RETRACTED position to its EXTENDED position.

BACKGROUND OF THE INVENTION

Currently, a number of companies manufacture different types of apparatus, machines, mechanisms, or the like, which can apply labels to packages, cartons, boxes, or the like, which are being conveyed along a predetermined conveyor path by means of a suitable conveyor mechanism. More particularly, one type of apparatus, machine, mechanism, or the like, can serially apply two separate labels to two mutually perpendicular surfaces of the package, box, carton, or the like, or alternatively, another type of apparatus, machine, mechanism, or the like, can apply a single label in a wrap-around manner with respect to a corner location of the package, box, carton, or the like, such that two separate and longitudinally spaced printed portions of a single label can be disposed upon two mutually perpendicular surfaces of the package, box, carton, or the like. Examples of such conventional apparatus, machines, mechanisms, and the like, are disclosed within U.S. Pat. No. 5,988,251 which issued to Hunt et al. on Nov. 23, 1999, U.S. Pat. No. 5,645,669 which issued to Crankshaw et al. on Jul. 8, 1997, U.S. Pat. No. 5,421,948 which issued to Crankshaw et al. on Jun. 6, 1995, and U.S. Pat. No. 4,844,771 which issued to Crankshaw et al. on Jul. 4, 1989.

As can be readily appreciated, however, from a review of such PRIOR ART, all of the disclosed and patented apparatus, machines, mechanisms, or the like, have operating deficiencies from the point of view of not being capable of achieving a particular mode of operation, or alternatively, comprising relatively complex interactive apparatus implements or components. For example, while the apparatus, system, or mechanism of Hunt et al. is capable of applying labels to two mutually perpendicular surfaces of a box, package, carton, or the like, such apparatus, system, or mechanism is lacking a means which is capable of achieving the application of a label onto a corner region of the box, package, carton, or the like, in accordance with a wrap-around mode of operation. In a similar manner, while the apparatus, system, or mechanism of Crankshaw et al., as disclosed within either one of U.S. Pat. No. 5,645,669 or U.S. Pat. No. 5,421,948, enables the application of a single label onto a corner region of an article in accordance with a wrap-around mode of operation, it is noted that the labels of the Crankshaw et al. apparatus, system, or mechanism are applied by means of a roller applicator as opposed to a tamp-type label applicator which is significantly less complex and easier to manipulate and control with respect to the actual transfer and application of the label from the label carrier onto the article, package, box, carton, or the like. In addition, it is also noted that in view of the fact that the labels, to be transferred and applied onto the article, package, box, carton, or the like, are carried by the roller applicator, the size of the label that can in fact be applied onto the article, package, box, carton, or the like, is effectively limited by means of the circumferential extent of the roller applicator. In connection with the lastly noted Crankshaw et al. U.S. Pat. No. 4,844,771, while a tamp-type label applicator is in fact disclosed for applying a label onto a surface portion of an article, package, box, carton, or the like, this apparatus, system, or mechanism of Crankshaw et al. lacks any means for applying labels to two mutually perpendicular surfaces of such article, package, box, carton, or the like, as well as to a corner region of the article, package, box, carton, or the like, in accordance with a wrap-around mode of operation.

Continuing further, an apparatus, machine, or system for applying labels to two mutually perpendicular surfaces of a package, box, carton, or the like, is also known to be manufactured by the Diagraph Corporation, however, again, such apparatus, machine or system is incapable of applying a single label to a corner region of the package, box, carton, or the like, in accordance with a wrap-around mode of operation. In addition, the actuator mechanism for applying the labels to the two mutually perpendicular surfaces of the box, package, carton, or the like, is relatively complex in that it comprises the mounting of a label applicator upon a rotary arm, and in turn, the mounting of the rotary arm upon a linearly extensible-retractible platform or support member. Still yet further, other known apparatus, machines, or systems require the stoppage or immobilization of the package, box, carton, or the like during the transfer and application of the label onto the package, box, carton, or the like, or alternatively, in order to in fact achieve the transfer and application of the label onto, for example, the two mutually perpendicular surfaces of the package, box, carton, or the like, two separate and distinct application implements are in fact required.

A need therefore exists in the art for a new and improved apparatus or machine, for applying labels to packages, boxes, cartons, or the like, which are being conveyed along a predetermined conveyor path by means of a suitable conveyor mechanism, wherein the apparatus, machine, or system would be capable of applying a single label onto two mutually perpendicular surfaces of the package, box, carton, or the like, in accordance with a first tamp or touch-contact application mode, as well as in accordance with a second slidable wrap-around application mode, and wherein further, the apparatus, machine, or system would nevertheless comprise relatively simple structure encompassing a relatively small number of component parts, such as, for example, a single air cylinder actuator mechanism and a split or dual applicator pad mechanism having a first applicator pad member fixedly mounted upon the forward or distal end portion of the piston rod of the air cylinder actuator mechanism, a second applicator pad member pivotally mounted upon the first applicator pad member by means of a suitable hinge mechanism disposed along a first side edge portion of the second applicator pad member, a roller member rotatably mounted upon a second side edge portion of the second applicator pad member, and a plurality of torsion springs interconnecting the first fixed and second movable applicator pad members, whereby a label can be effectively applied onto a side surface of a package, carton, box, or the like, wrapped around a trailing end corner region of the package, carton, box, or the like, and onto a trailing end face of the package, carton, box, or the like, all in accordance with a predetermined, program-controlled, combination tamp/touch-contact and slidable/wipe-on application mode of operation.

SUMMARY OF THE INVENTION

The foregoing and other objectives are achieved in accordance with the teachings and principles of the present invention through the provision of a new and improved apparatus, mechanism, or machine, for applying labels to packages, boxes, cartons, or the like that are being conveyed along a predetermined conveyor path by means of a suitable conveyor mechanism, wherein the same comprises a single air cylinder actuator, comprising a piston rod which is movable between a RETRACTED position and an EXTENDED position, and a split or dual label applicator pad assembly. The split or dual label applicator pad assembly comprises a first label applicator pad member fixedly mounted upon the forward or distal end portion of the piston rod of the single air cylinder actuator, and a second label applicator pad member which is pivotally mounted upon the first fixed label applicator pad member by means of a hinge mechanism which is disposed along a first side edge portion of the second movable label applicator pad member and which hingedly interconnects the second label applicator pad member to a side edge portion of the first label applicator pad member.

An applicator roller is disposed upon a second side edge portion of the second movable label applicator pad member, and a plurality of torsion springs effectively maintain the second movable label applicator pad member disposed at an undeflected HOME position at which the second movable label applicator pad member is disposed in a substantially coplanar manner with respect to the first label applicator pad member so as to effectively apply, for example, a downstream half-end portion of a label onto a side face of a package, carton, box, or the like. The torsion springs also permit the second label applicator pad member to be pivotally moved away from the HOME position to any one of several deflected APPLICATION positions so as to enable the second movable label applicator pad member to effectively wrap the label around a trailing end corner region of the package, carton, box, or the like, and to then wrap an upstream half-end portion of the label onto a trailing end face of the package, carton, box, or like, all in accordance with a predeterminedly controlled combination tamp/touch-contact and a slidable/wipe-on application mode of operation which is conducted in conjunction with the extension of the piston rod of the single air cylinder actuator from its RETRACTED position to its EXTENDED position which, of course, causes the split or dual label applicator pad assembly to be correspondingly moved from its RETRACTED position or state to its EXTENDED position or state.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein:

FIG. 2 is a substantially front elevational view of the new and improved split or dual label applicator pad assembly, as constructed in accordance with the principles and teachings of the present invention and as disclosed with-in FIG. 1, showing, in particular, the front faces of both the fixed and pivotally movable label applicator pad members wherein an array of apertures are defined within the front faces of the label applicator pad members so as to effectively provide vacuum suction to the front faces of the label applicator pad members and thereby cause the adherence of the labels upon the label applicator pad members in preparation for the deposition of the labels onto the predetermined side face and trailing end face surfaces of the particular packages, cartons, boxes, and the like;

DETAILED DESCRIPTION OF THE PREFERRED EMBODIMENT

Figure 1:
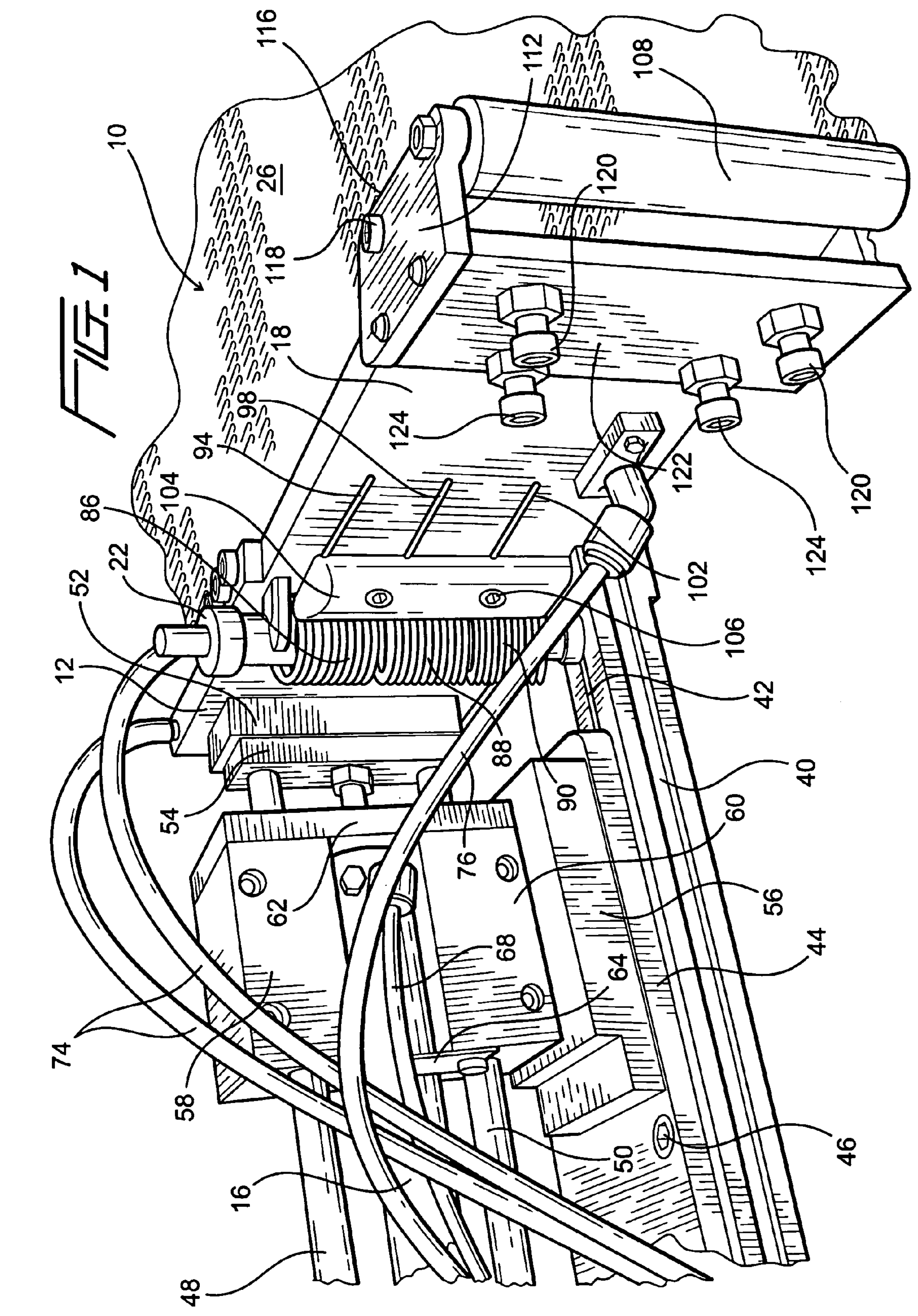
FIG. 1 is a perspective view showing the back side or rear portion of the new and improved split or dual label applicator pad assembly, constructed in accordance with the principles and teachings of the present invention and showing the operative components thereof, particularly the pivotal mounting of the applicator roller upon the free edge portion of the pivotally movable label applicator pad member, the provision of the torsion spring assembly operatively associated with the hinge mechanism which pivotally mounts the pivotally movable label applicator pad member upon the fixed label applicator pad member, and the operative connection of the fixed label applicator pad member to the forward or distal end portion of the piston rod member of the air cylinder actuator assembly through means of the associated guide rods and guide block members, the piston rod member of the air cylinder actuator assembly being illustrated at its RETRACTED position so as to, in turn, dispose the label applicator pad members at their inoperative positions relative to the conveyor path along which the packages, cartons, boxes, or the like are being conveyed.

Referring now to the drawings, and more particularly to FIGS. 1-4 thereof, a new and improved split or dual label applicator pad assembly, constructed in accordance with the principles and teachings of the present invention and showing the cooperative component parts thereof, is disclosed and is generally indicated by the reference character 10. More particularly, the new and improved split or dual label applicator pad assembly 10 is seen to comprise a first label applicator pad member 12 which is adapted to be fixedly mounted upon the free or distal end portion of a piston rod 14 of an air cylinder actuator assembly 16, and a second label applicator pad member 18 which is adapted to be pivotally mounted along a first, vertically oriented side edge portion 20 thereof by means of a suitable, vertically oriented hinge mechanism 22 which is also operatively mounted upon a corresponding, vertically oriented side edge portion 24 of the first label applicator pad member 12 so as to effectively establish the hinged, pivotal connection between the first and second label applicator pad members 12, 18. As can best be appreciated, for example, from any one of the FIGS. 5-7, packages, cartons, boxes, and the like, are adapted to be conveyed along a conveyor 26 in the direction of movement indicated by means of the arrow DOM, that is, in the direction extending from right to left as viewed in the drawing figures, and an exemplary carton is illustrated at 28. When a downstream half-end portion of a single label is to be applied to, for example, a side surface 30 of the carton 28, and then subsequently wrapped around a trailing end corner region 32 of the carton 28 so as to permit an upstream half-end portion of the single label to be applied to, for example, the trailing end surface 34 of the carton 28, the air cylinder actuator assembly 16 of the new and improved split or dual label applicator pad assembly 10 of the present invention will be actuated so as to move the piston rod 14 of the air cylinder actuator assembly 16 from its RETRACTED position or state to its EXTENDED position or state so as to, in turn, move the split or dual label applicator pad members 12, 18 from their RETRACTED positions or states to their EXTENDED positions or states at which point in time the second label applicator pad member 18 will initially engage the side surface 30 of the carton 28 in preparation for the application of the single label onto the carton 28 as will be more fully disclosed hereinafter. The opposite side surface 36 of the carton 28 will accordingly be forced into engagement with a guide rail member 38, adjustably positioned with respect to the conveyor 26, so as to facilitate the actual application of the single label onto the side and trailing end surfaces 30, 34 of the carton 28 as the conveyor 26 causes the carton 28 to be moved past the split or dual label applicator pad assembly 10 along the direction of movement DOM.

In order to achieve the aforenoted movement of the split or dual label applicator pad members 12, 18 from their RETRACTED positions or states to their EXTENDED positions or states in accordance with the movement of the piston rod 14 of the air cylinder actuator assembly 16 from its RETRACTED position or state to its EXTENDED position or state, it is to be recalled that the first label applicator pad member 12 is effectively fixedly mounted upon the forward or distal end portion of the piston rod 14 of the air cylinder actuator assembly 16. More particularly, it is seen, as can best be appreciated from FIGS. 1,3, and 4, that a rail framework member 40 is fixedly disposed at a position adjacent to the conveyor 26 so as to extend substantially perpendicular with respect to the longitudinal extent of the conveyor 26 and with respect to the direction of movement DOM of, for example, the carton 28 along the conveyor 26. The upper surface portion of the rail framework member 40 is provided with a longitudinally extending slot 42, and a base member 44 is adapted to be adjustably positioned along the slotted rail framework member 40 as a result of a set screw 46, or similar fastener, being operatively engaged and securely fastened within the slot 42 of the rail framework member 40. In this manner, the disposition of the base member 44 with respect to the conveyor 26 can be readily adjusted. It is additionally seen, as can best be appreciated from FIG. 3, that in conjunction with the piston rod 14 of the air cylinder actuator assembly 16, a pair of vertically spaced guide rods 48, 50 are disposed above and below the piston rod 14 so as to extend parallel thereto.

Figure 4:
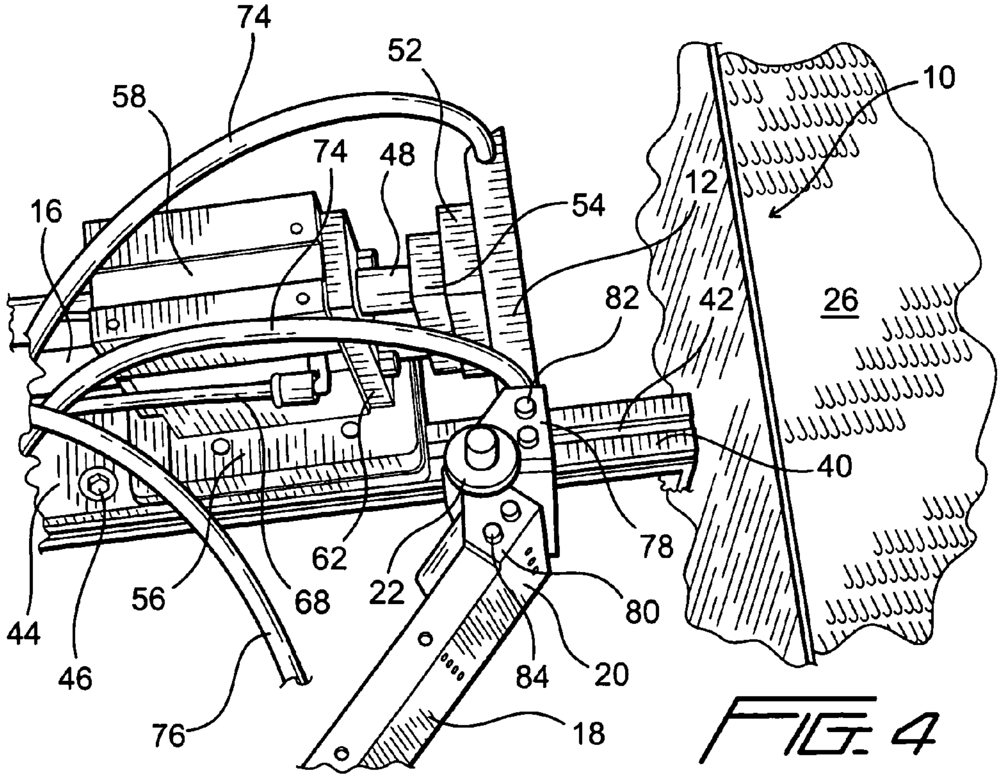
FIG. 4 is a substantially top plan view of the new and improved split or dual label applicator pad assembly, as illustrated within FIGS. 1-3, and showing, in particular, the pivotal mounting of the pivotally movable label applicator pad member upon the fixed label applicator pad member by means of the hinge mechanism pivotally interconnecting the pivotally movable and fixed label applicator pad members together.

Still further, as can best be seen in FIGS. 1 and 4, a mounting block 52 is fixedly mounted upon the rear face of the first label applicator pad member 12, and in turn, a connector block 54 is fixedly secured upon the rear face of the mounting block 52 so as to effectively fixedly interconnect the forward or distal end portions of the piston rod 14 and the two guide rods 48, 50 together in an integral manner.

In addition, it is also seen that a support block 56 is fixedly mounted upon the base member 44, and the pair of guide rods 48, 50 are slidably disposed within a pair of vertically spaced, upper and lower guide blocks 58, 60 which are provided for respectively slidably guiding the pair of guide rods 48, 50 as the guide rods 48, 50 effectively reciprocate between their EXTENDED and RETRACTED positions in conjunction with the movement of the piston rod 14 of the air cylinder actuator assembly 16 as the same is moved by means of the air cylinder actuator assembly 16 between its EXTENDED and RETRACTED positions.

The lower one of the pair of guide blocks 60 is fixedly mounted upon the support block 56, and it is seen that a forwardly disposed connector block 62 integrally connects the forward end portions of the guide blocks 58, 60 together, while a rearwardly disposed connector plate 64 similarly integrally connects the rearward end portions of the guide blocks 58, 60 together, all of such components therefore effectively forming an integral guide block assembly. In order to provide for the dual actuation of the piston rod 14 internally within the air cylinder actuator assembly 16, a first air hose 66 is fluidically connected to a suitable source of pressurized air, not shown, so as to fluidically supply control air to a rear end portion of the air cylinder actuator assembly 16 as can best be seen in FIG. 2, while a second air hose 68 is fluidically connected to the source of pressurized air, not shown, so as to fluidically supply control air to a forward end portion of the air cylinder actuator assembly 16 as can best be seem in FIG. 4.

Continuing further with the description of the specific structure comprising the split or dual label applicator pad assembly 10, and with reference again being made to FIGS. 1-4, it is to be appreciated that both of the label applicator pad members 12, 18 comprise hollow interior structures, and it is seen that the front face of the first, fixed label applicator pad member 12 is provided with a plurality of apertures 70 which are arranged within horizontally spaced, vertically oriented arrays across the front face thereof. The apertures 70 are fluidically connected to the hollow interior structure of the first, fixed label applicator pad member 12, and in a similar manner, the front face of the second, pivotally movable label applicator pad member 18 is provided with a plurality of apertures 72 which are likewise arranged within horizontally spaced, vertically oriented arrays across the front face thereof, the apertures 72 likewise being fluidically connected to the hollow interior structure of the second, pivotally movable label applicator pad member 18. First and second vacuum hoses 74, 76 are respectively connected to the upper edge portion of the first, fixed label applicator pad member 12 and to the rear face of the second, pivotally movable label applicator pad member 18 so as to fluidically connect the hollow interior structures comprising the first and second label applicator pad members 12, 18 to a suitable source of vacuum, not shown. In this manner, vacuum or suction forces will effectively be generated at the sites of the apertures 70, 72 defined within the front faces of the first and second label applicator pad members 12, 18, and accordingly, when a label is printed and dispensed onto the split or dual label applicator pad assembly 10, the vacuum or suction forces generated at the sites of the apertures 70, 72 defined within the front faces of the first and second label applicator pad members 12,18 will cause the label to be satisfactorily adhered upon the front faces of the first and second label applicator pad members 12, 18 until the label is ready to be transferred onto the carton 28 as will be more fully discussed hereinafter. It is lastly noted at this juncture that while a pair of vacuum hoses 74 have been illustrated as being provided in conjunction with the first, fixed label applicator pad member 12, whereas only a single vacuum hose 76 has been illustrated as being provided in conjunction with the second, pivotally movable label applicator pad member 18, the number of vacuum hoses that may be respectively connected to either one of the first and second label applicator pad members 12, 18 may be varied as may be desired or required in order to respectively provide the first and second label applicator pad members 12, 18 with sufficient vacuum or suction forces.

Figure 2:
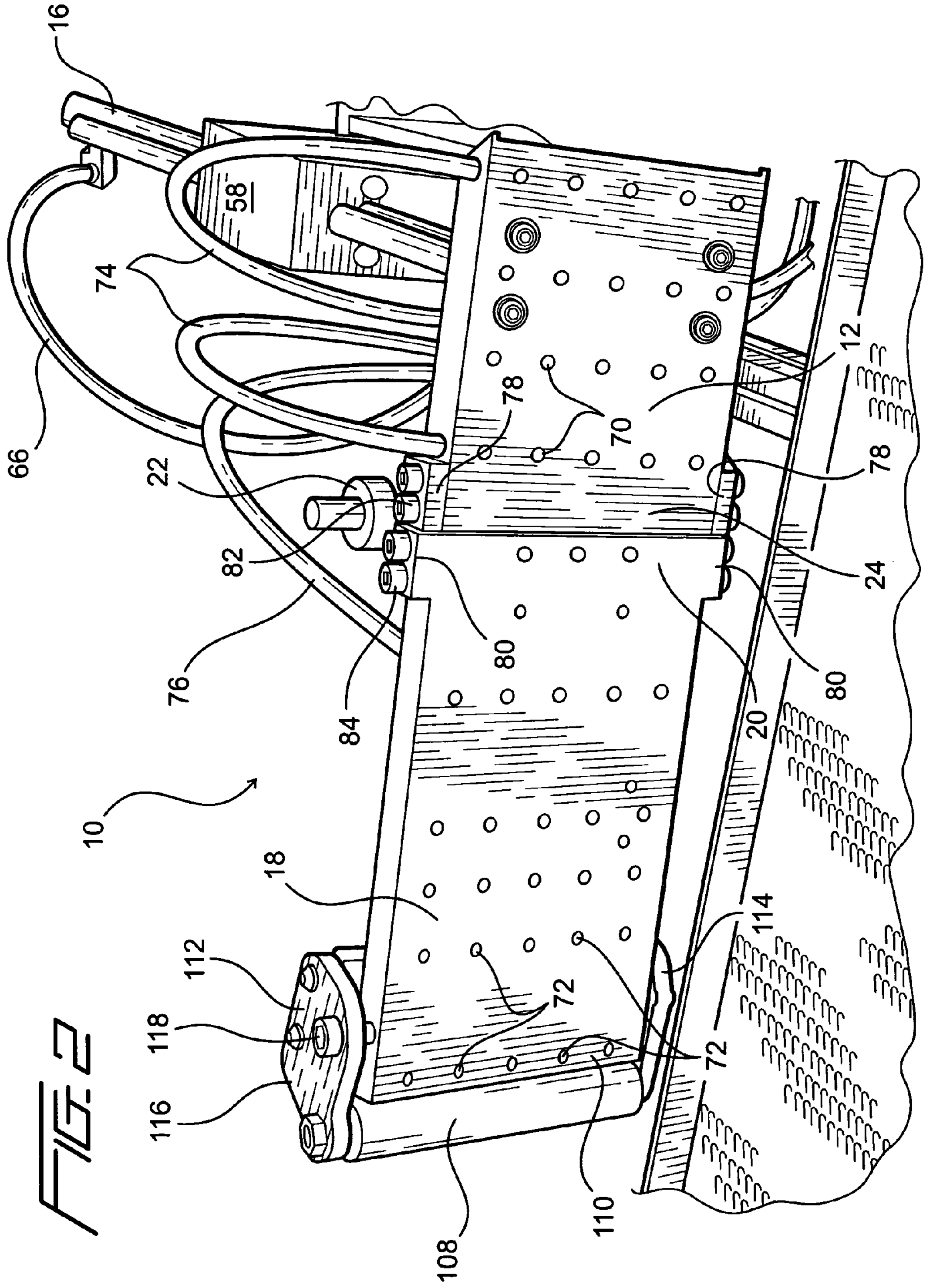
Figure 3:
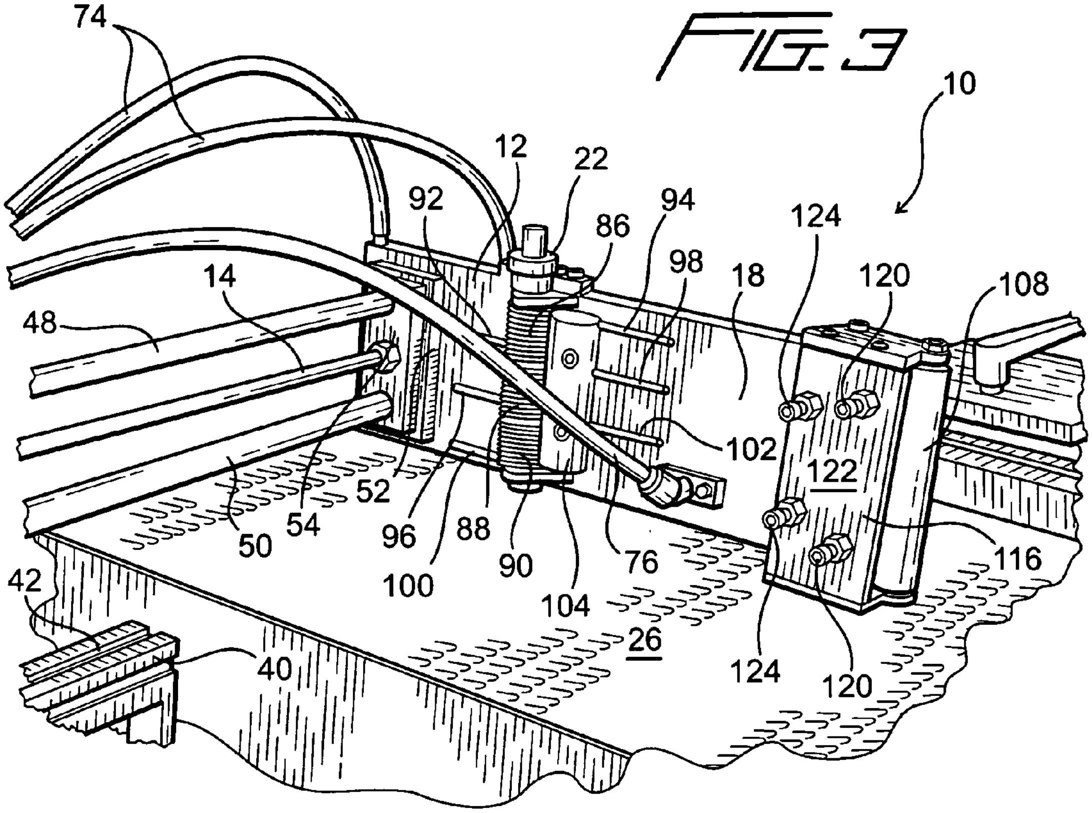
FIG. 3 is a perspective view, somewhat similar to that of FIG. 1 but showing the back side or rear portion of the new and improved split or dual label applicator pad assembly, as constructed in accordance with the principles and teachings of the present invention, from a slightly different perspective, wherein the label applicator pad members are disposed at their operative positions relative to the conveyor path along which the particular packages, cartons, boxes, or the like, are being conveyed, as a result of the fact that the piston rod member of the air cylinder actuator assembly has been operatively moved from its RETRACTED position, as illustrated within FIG. 1, to its EXTENDED position.

Continuing further, as can be further appreciated from the various drawing figures, it is noted that, during the operative cycle of applying a label onto the carton 28, the second, pivotally movable label applicator pad member 18 is adapted to be moved from its undeflected HOME position, at which the second, pivotally movable label applicator pad member 18 is disposed in a substantially coplanar manner with respect to the first, fixed label applicator pad member 12, as illustrated within FIGS. 1-3, to any one of several deflected APPLICATION positions, as illustrated within FIGS. 4-7, depending upon the particular phase of the label application cycle which is being conducted at a particular point in time. The aforenoted pivotal movements of the second, pivotally movable label applicator pad member 18 with respect to the first, fixed label applicator pad member 12 are of course enabled by means of the hinge mechanism 22, and as may best be appreciated from FIGS. 2 and 4, the hinge mechanism 22 is fixedly connected to, and effectively interconnects, the first and second label applicator pad members 12, 18 by means of suitable upper and lower sets of mounting brackets 78, 80 which are fixedly secured to the side edge portions 24, 20 of the first and second label applicator pad members 12, 18 by means of suitable bolt fasteners 82, 84, or the like.

In addition, in order to effectively always bias the second, pivotally movable label applicator pad member 18 with respect to the first, fixed label applicator pad member 12 and toward its undeflected HOME position at which the second, pivotally movable label applicator pad member 18 is disposed substantially coplanar with respect to the first, fixed label applicator pad member 12, a vertically oriented, stacked array of torsion spring members, such as, for example, three torsion spring members 86, 88, 90, are disposed around the hinge mechanism 22. Opposite ends 92, 96, 100 and 94, 98, 102 of each one of the coil spring members 86, 88, 90 are adapted to be respectively disposed in contact with the rear faces of the first and second label applicator pad members 12, 18, and in order to maintain the opposite ends 92-102 of the torsion spring members 86-90 disposed in engaged contact with the noted rear faces of the first and second label applicator pad members 12, 18, the ends 92, 96, 100 of the torsion spring members 86-90 are disposed in contact with the rear face of the first, label applicator pad member 12, while a clamping plate 104 is fixedly secured to the rear face of the second, label applicator pad member 18, by means of suitable bolt fasteners 106, so as to effectively maintain the ends 94-102 of the torsion spring members 86-90 engaged in contact upon the rear face of the second, label applicator pad member 18.

In order to complete the structural composition of the new and improved split or dual label applicator pad assembly 10 of the present invention, it is lastly seen that an applicator roller 108 is rotatably mounted upon the side edge portion 110 of the second, label applicator pad member 18 which is disposed opposite the side edge portion 20 of the second, label applicator pad member 18 which is pivotally connected to the first, label applicator pad member 12. More particularly, the applicator roller 108 has opposite upper and lower trunnion end portions thereof rotatably mounted within upper and lower mounting brackets 112, 114 of an applicator roller housing or framework 116, and it is to be appreciated that the entire applicator roller housing or framework 116 is pivotally mounted upon the side edge portion 110 of the second label applicator pad member 18 by means of, for example, a pair of vertically aligned pivot pins 118, or the like. The pivotal mounting of the applicator roller housing or framework 116 upon the second label applicator pad member 18 effectively permits the applicator roller 108 to be positionally adjustable with respect to the front face of the second label applicator pad member 18 such that the applicator roller 108 can be disposed in a substantially coplanar manner with respect to the front face of the second label applicator pad member 18 whereby the labels to be applied to the cartons conveyed along the conveyor 26 can be properly adhered upon the first and second label applicator pad members 12, 18. In addition, the pivotal mounting of the applicator roller housing or framework 116 upon the second label applicator pad member 18 effectively permits the applicator roller 108 to be deflected and pivotally moved with respect to the second label applicator pad member 18 so as to accommodate the disposition of the different cartons being conveyed along the conveyor 26, as well to accommodate any different contours characteristic of the different cartons being conveyed along the conveyor 26, during the various phases of the label application cycle, such various pivotal movements of the applicator roller housing or framework 116 with respect to the front face of the second label applicator pad member 18 being disclosed, for example, within FIGS. 5-7.

In order to achieve the aforenoted pivotally adjustable mounting of the applicator roller housing or framework 116 upon the second label applicator pad member 18, a pair of vertically spaced cap screws 120, 120 are threadedly mounted within a rear wall member 122 of the applicator roller housing or framework 116, as can best be seen and appreciated from FIGS. 1 and 3. The cap screws 120, 120 are adapted to pass through the rear wall member 122 of the applicator roller housing or framework 116 and be disposed in contact with and operatively engage the rear face of the second label applicator pad member 18. In addition, a pair of vertically spaced compression spring members 124, 124 are also mounted within the rear wall member 122 of the applicator roller housing or framework 116 and are adapted to likewise pass through the rear wall member 122 of the applicator roller housing or framework 116 in order to similarly be disposed in contact with and engage the rear face of the second label applicator pad member 18 so as to normally bias the applicator roller housing or framework 116 toward its adjusted position as determined by means of the cap screws 120, 120. In this manner, as the cap screws 120, 120 are threadedly engaged within the rear wall member 122 of the applicator roller housing or framework 116, they can adjust the relative disposition of the applicator roller 108 with respect to the front face of the second label applicator pad member 18 as a result of the pivotal movement of the entire applicator roller housing or framework 116 around the pivot pins 118 under the influence or biasing forces of the compression spring members 124, 124. In addition, as the applicator roller housing or framework 116 is pivotally moved around the pivot axis defined by means of the pivot pins 118, as a result of the engagement of the applicator roller 108 with the trailing corner region 32 and the trailing end face 34 of the carton 28, as disclosed, for example, within FIGS. 5-7, the applicator roller housing or framework 116 will pivotally move in a clockwise direction, as viewed in FIG. 1, for example, against the biasing forces of the compression spring members 124, 124, however, when the applicator roller 108 is subsequently effectively disengaged from its contact engagement with the carton 28, the compression spring members 124, 124 will tend to return the applicator roller housing or frame-work 116 to its normal position as determined by means of the adjustable cap screws 120, 120.

Figure 5:
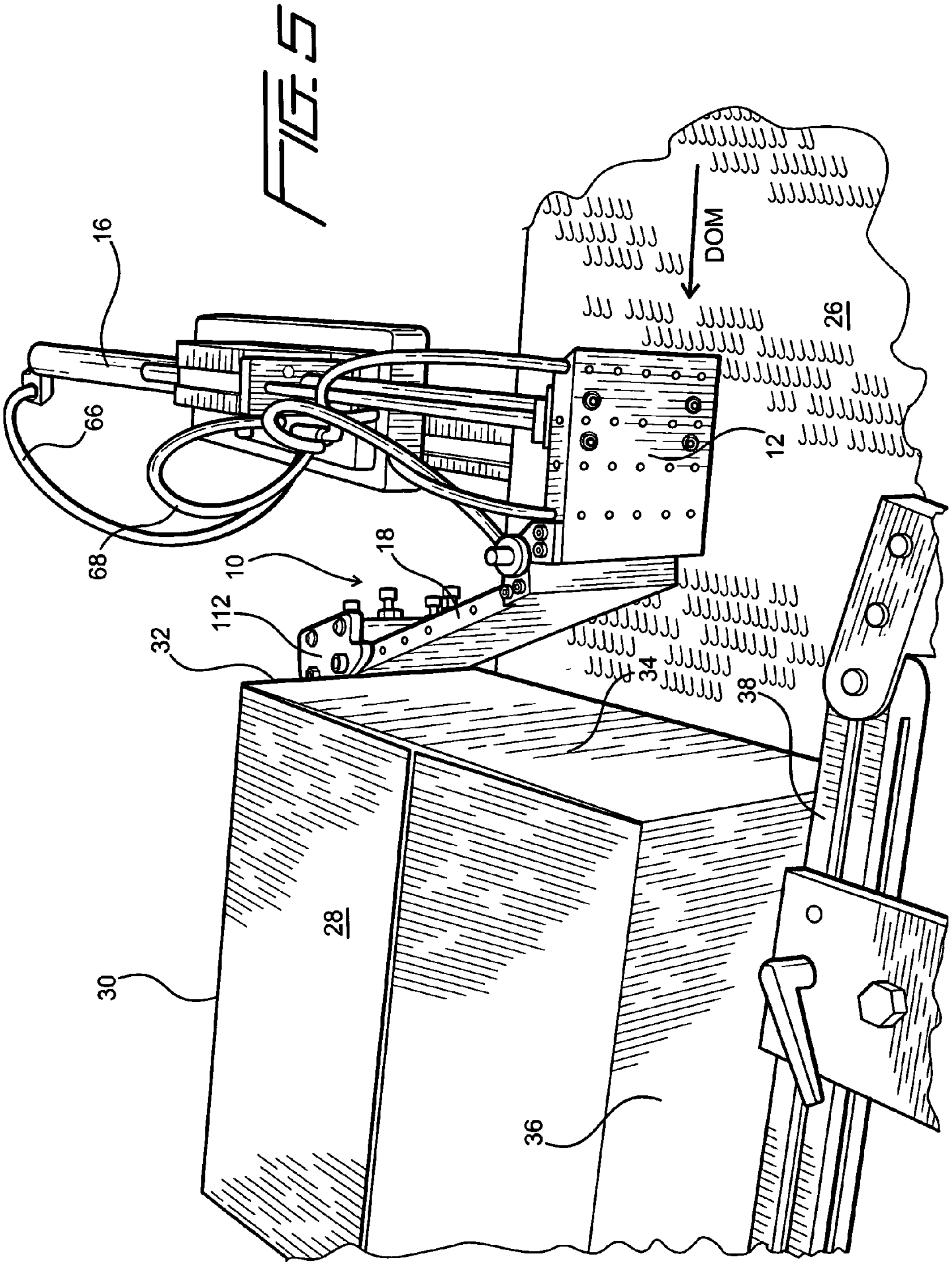
FIGS. 5-7 are top perspective views of the new and improved split or dual label applicator pad assembly, as has been illustrated within FIGS. 1-4, when the split or dual label applicator pad assembly has been moved to its operative position as a result of the piston rod member of the air cylinder actuator assembly having been operatively moved from its RETRACTED position, as illustrated within FIG. 1, to its EXTENDED position, wherein the pivotally movable applicator pad member is illustrated at sequential positions during the application of a label upon a side face of a box or carton, around a trailing edge corner region of the box or carton, and upon a trailing face of the carton or box.
Figure 6:
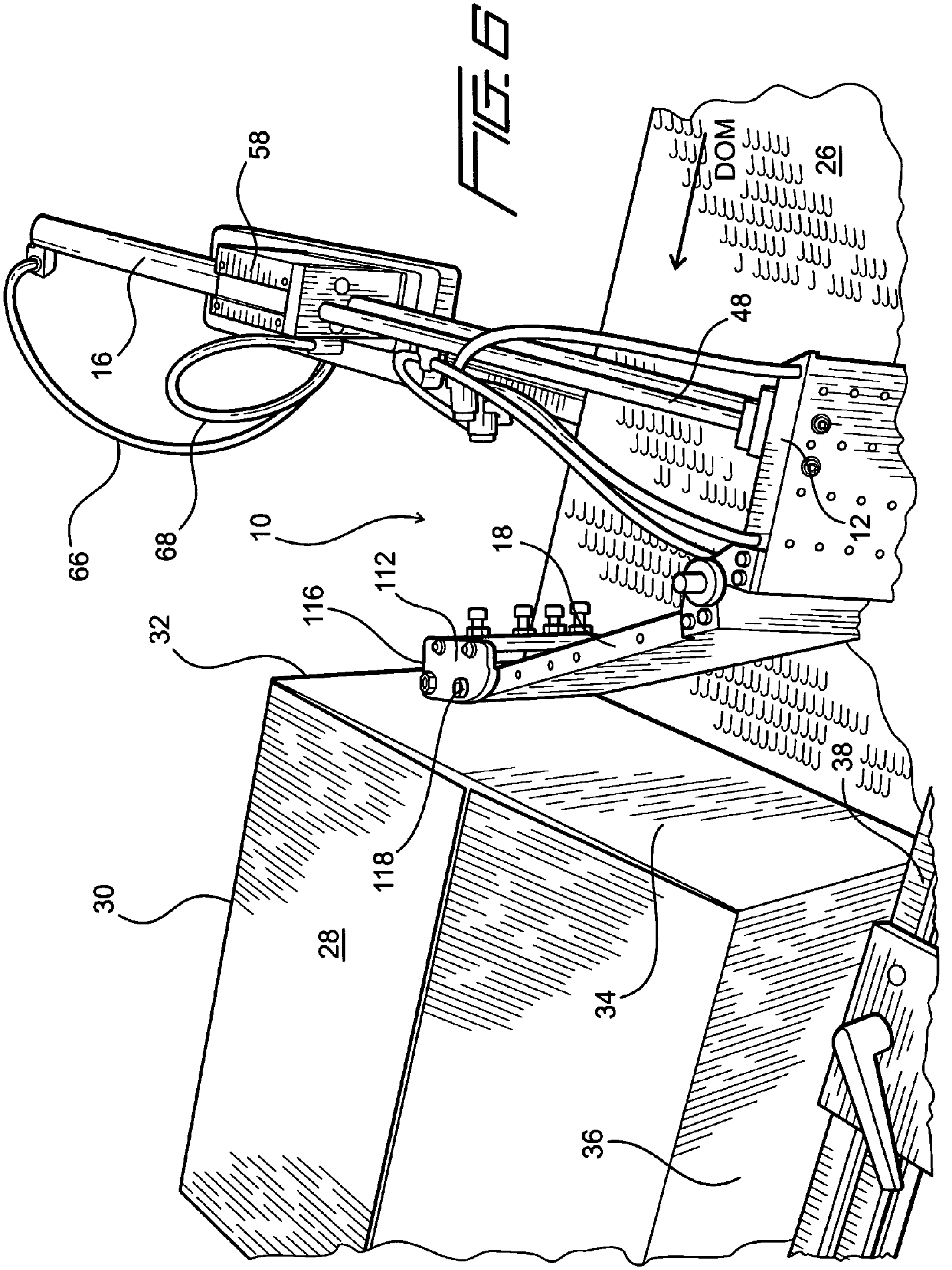
Figure 7:
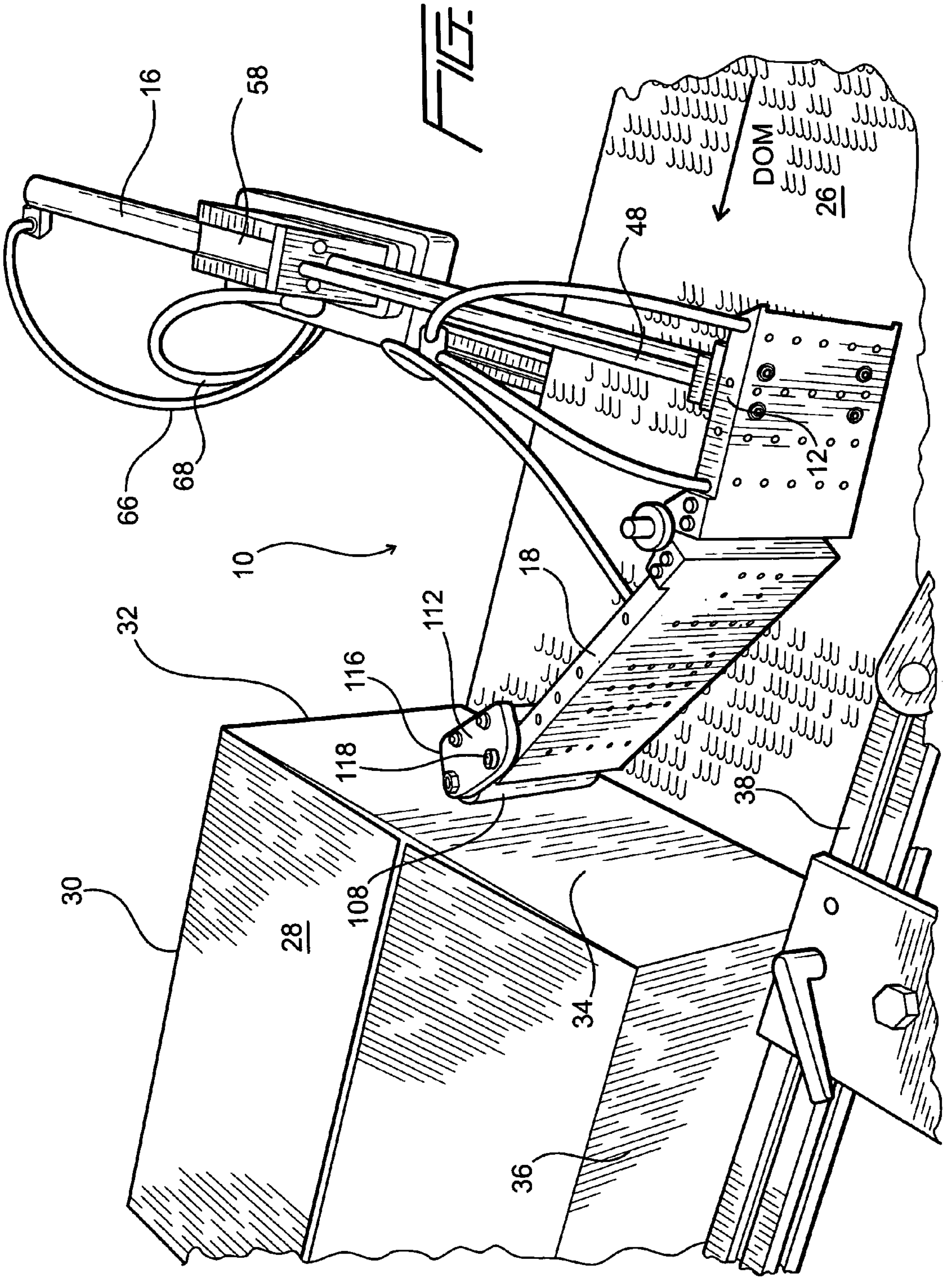
Figure 8:
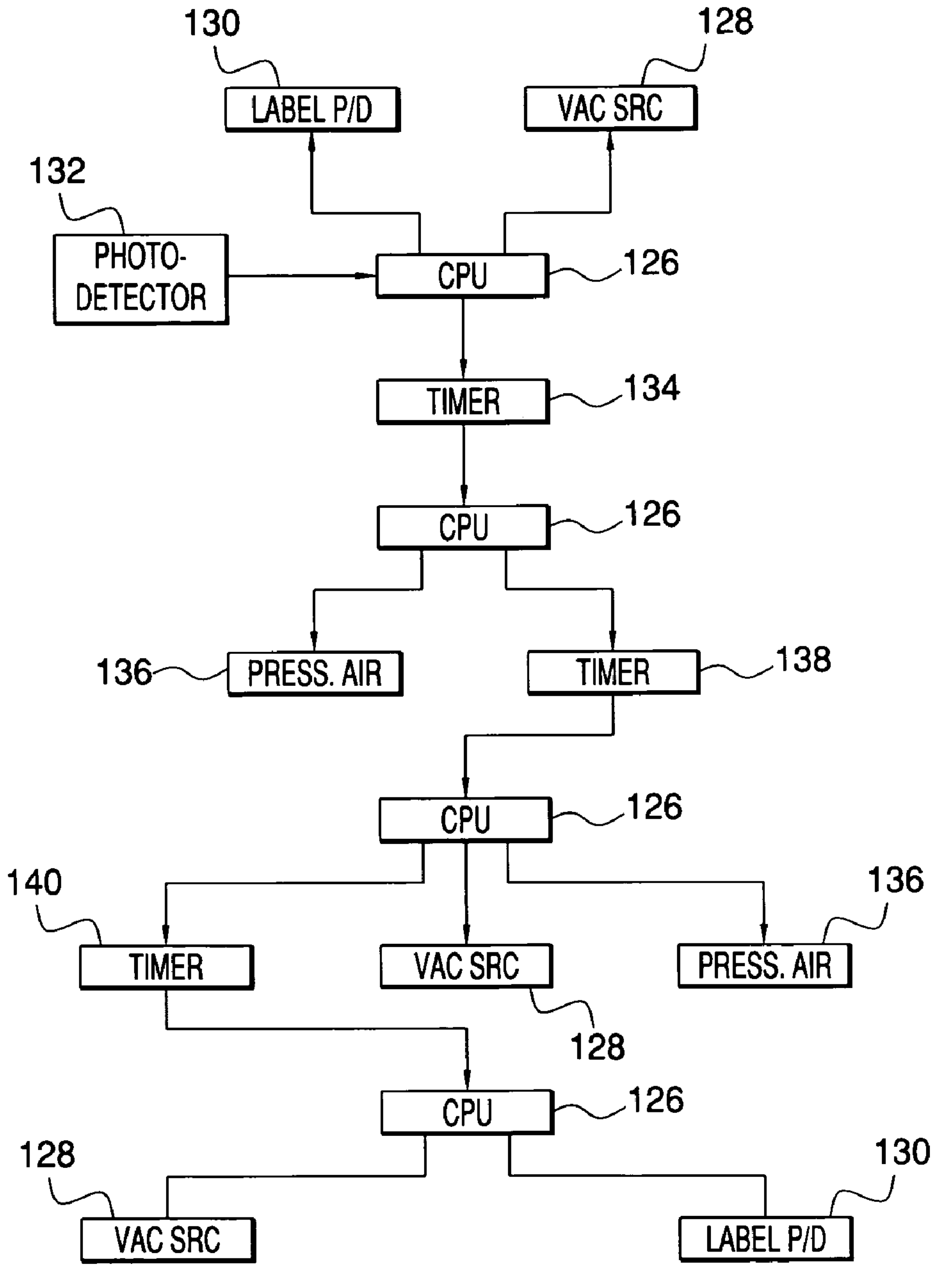
FIG. 8 is a flow chart schematically illustrating the operative sequence of the various operative components of the new and improved split or dual label applicator pad assembly of the present invention in accordance with, and during, a typical label application cycle.

Having described the various structural components comprising the new and improved split or dual label applicator pad assembly 10 of the present invention, the method of operating the same, in accordance with a typical label application cycle for applying a label onto a carton 28 being conveyed along the conveyor 26, will now be disclosed with specific reference also being made to FIG. 8 in addition to reference being made to FIGS. 5-7. More particularly, as has been previously disclosed within U.S. Pat. No. 6,615,106 which issued to Soto et al. on Sep. 2, 2003, the pertinent disclosure of which is incorporated herein by reference, the various operative components of the new and improved split or dual label applicator pad assembly 10 of the present invention will be under the control, for example, of various sensors, timers, and a microprocessor, programmable logic controller (PLC), or central processing unit (CPU) in order to in fact achieve the label application operation in connection with the application of a label onto a carton 28.

As disclosed, for example, within FIG. 8, when a label application operation is to be commenced, a central processing unit (CPU) 126 transmits a signal to the vacuum source 128 such that vacuum or suction forces are generated upon the front faces of the first and second label applicator pad members 12, 18, and in conjunction with such, the central processing unit (CPU) 126 also transmits a signal to a suitable label printer-dispenser 130 whereby the label printer-dispenser 130 prints a label and dispenses the same onto the front faces of the first and second label applicator pad members 12, 18 of the split or dual label applicator pad assembly 10, the label being adhered upon the front faces of the first and second label applicator pad members 12, 18 by means of the aforenoted vacuum or suction forces which have been generated at such locations by the vacuum source 128. A sensor 132, such as, for example, a photodetector, is disposed at a position which is upstream of the split or dual label applicator pad assembly 10, as considered in connection with the direction of movement DOM of the conveyor 26, and upon detecting the presence and passage of a carton 28 past the photodetector 132, a signal is transmitted from the photodetector 132 to the central processing unit (CPU) 126. The central processing unit (CPU) 126, which is also operatively connected to the article or product conveyor 26 and therefore knows the conveyance speed of the conveyor 26, transmits a signal to a first timer 134 such that a first timer cycle is initiated, during which time the conveyor 26 will in fact convey the carton 28 to a position which is within the vicinity of the split or dual label applicator pad assembly 10.

When the first timer cycle has timed out, the first timer 134 transmits a signal back to the central processing unit (CPU) 126 which, in turn, transmits a control signal to the source of pressurized air 136 which is fluidically connected to the air cylinder actuator assembly 16 so as to cause the piston rod 14 of the air cylinder actuator assembly 16 to be moved from its RETRACTED position or state toward its EXTENDED position or state. In conjunction with the activation of the source of pressurized air 136, the central processing unit (CPU) 126 also activates a second timer 138 which will maintain the source of pressurized air 136 activated for a predetermined period of time which will be sufficiently long enough for the label to be applied onto the side surface 30 of the carton 28, wrapped around the trailing end corner region 32 of the carton 28, and applied onto the trailing end surface 34 of the carton 28. Accordingly, as a result of the activation of the source of pressurized air 136, both of the first and second label applicator pad members 12, 18, disposed in their coplanar mode or state, will be advanced toward the carton 28 disposed upon the conveyor 26, it being appreciated, however, that at this point in time, the carton 28 has been conveyed to a position, relative to the first and second label applicator pad members 12, 18, at which the carton 28 has effectively moved past the first label applicator pad member 12 so as to effectively be disposed downstream of the first label applicator pad member 12. Thus, only the second label applicator pad member 18 will actually make contact with, and be disposed in engagement with the side surface 30 of the carton 28, whereby only the downstream half-end portion of the label, disposed upon both the first and second label applicator pad members 12,18, will actually be deposited and applied onto the side surface 30 of the carton 28 at this point in time in accordance with a tamp/touch-contact mode.

In addition, as the conveyor 26 conveys the carton 28 in the downstream direction as denoted by means of the direction of motion DOM, the applicator roller 108 will securely adhere the downstream half-end portion of the label onto the side surface 30 of the carton 28 by rolling therealong in accordance with a slidable/wipe-on mode of operation. In view of the fact that the downstream half-end portion of the label has now been adhered onto the side surface 30 of the carton 28, then as the carton 28 continues to be conveyed in the downstream direction of movement DOM, the label will be continuously removed, in effect, from the first and second label applicator pad members 12,18, and the applicator roller 108 will, in effect, move in the upstream direction relative to the carton 28. Accordingly, the applicator roller 108 is continuously moved along the side surface 30 of the carton 28 in the direction toward the trailing end corner region 32 of the carton 28, and upon reaching the trailing end corner region 32 of the carton 28, the applicator roller 108 will, in effect, cause the upstream half-end portion of the label to be wrapped around the trailing end corner region 32 of the carton 28 and onto the trailing end surface portion 34 of the carton 28 in accordance with a slidable/wipe-on mode of operation. It is of course to be appreciated that this movement of the applicator roller 108, and its continuous contact and engagement with the side and trailing end surfaces 30, 34 of the carton 28, as well as with the trailing end corner region 32 of the carton 28, is facilitated by the continuous movement of the first, fixed, upstream label applicator pad member 12 to its EXTENDED position or state, as a result of the activation and movement of the piston rod 14 of the air cylinder actuator assembly 16 to its EXTENDED position or state, under the influence of the source of pressurized air 136, as well as by the hinged, pivotal mounting of the second, downstream label applicator pad member 18 upon the first, fixed, upstream label applicator pad member 12, which permits the second, downstream label applicator pad member 18 to be moved to its various DEFLECTED positions against the biasing forces of the torsion spring members 86-90, all as can be readily appreciated from the sequential views comprising FIGS. 5-7.

When the second timer 138 has timed out, which means that the label has been completely applied and adhered onto the carton 28, and that the carton 28 has been moved further downstream by means of the conveyor 26, a signal is transmitted from the second timer 138 to the central processing unit (CPU) 126, and in response to such signal from the second timer 138, the central processing unit (CPU) 126 will transmit a signal to the vacuum source 128 so as to terminate the generation of the vacuum conditions upon the front faces of the first and second label applicator pad members 12, 18, and in addition, the central processing unit (CPU) 126 will also transmit a signal to the source of pressurized air 136 so as to effectively reverse its activation of the air cylinder actuator assembly 16 whereby the piston rod 14 of the air cylinder actuator assembly 16 will now be moved back from its EXTENDED position or state to its RETRACTED position or state in preparation for a new label application cycle.

Still further, the central processing unit (CPU) 126 will also send a signal to a third timer 140 which, when the third timer 140 times out, transmits a signal back to the central processing unit (CPU) 126 so as to enable the central processing unit (CPU) 126 to transmit a signal to the vacuum source 128, so as to once again generate vacuum conditions upon the front faces of the first and second label applicator pad members 12, 18 in preparation for retaining a new label thereon, as well as to enable the central processing unit (CPU) 126 to transmit a signal to the label printer-dispenser 130 so as to dispense the new label which is to be deposited upon the first and second label applicator pad members 12, 18. An entirely new label application cycle is therefore now ready to be implemented in connection with the conveyance of a new carton along the conveyor 26.

Thus, it may be seen that in accordance with the principles and teachings of the present invention, there has been disclosed a new and improved apparatus, mechanism, or machine, for applying labels to packages, boxes, cartons, or the like that are being conveyed along a predetermined conveyor path by means of a suitable conveyor mechanism, wherein the same comprises a single air cylinder actuator, comprising a piston rod which is movable between a RETRACTED position and an EXTENDED position, and a split or dual label applicator pad assembly which comprises a first label applicator pad member fixedly mounted upon the forward or distal end portion of the piston rod of the single air cylinder actuator, and a second label applicator pad member which is pivotally mounted upon the first fixed label applicator pad member by means of a hinge mechanism which hingedly interconnects the second label applicator pad member to the first label applicator pad member. An applicator roller is disposed upon the second movable label applicator pad member, and in accordance with the label application mode of operation, the applicator roller adheres a downstream half-end portion of a label onto a side face of the carton, wraps the label around a trailing end corner region of the carton, and applies an upstream half-end portion of the label onto the trailing end face of the carton, all in accordance with a predeterminedly controlled combination tamp/touch-contact and a slidable/wipe-on application mode of operation. Torsion springs are operatively associated with the hinge mechanism so as to permit the second label applicator pad member to be moved to one or more DEFLECTED positions attendant the label application process and yet return the second label applicator pad member to its HOME position upon completion of the label application process.

Obviously, many variations and modifications of the present invention are possible in light of the above teachings. For example, while it has been noted that a new label is printed and dispensed onto the label applicator pads in accordance with time-controlled operations, such label printing and dispensing can alternatively be initiated solely in response to the presence or detection of an oncoming package, carton, box, or the like. It is therefore to be understood that within the scope of the appended claims, the present invention may be practiced otherwise than as specifically described herein.

What is claimed as new and desired to be protected by Letters Patent of the United States of America, is:

1. Apparatus for applying labels to different surfaces of an article being conveyed along an article conveyor path, comprising:

a first label support pad assembly;

a second label support and applicator pad assembly;

means for connecting said second label support and applicator pad assembly to said first label support pad assembly such that said second label support and applicator pad assembly is movable with respect to said first label support pad assembly;

said first label support and second label support and applicator pad assemblies together defining surface means for mounting a single label, to be applied to an article being conveyed along an article conveyor path, upon said first and second label applicator pad assemblies;

actuator means, connected to said first label support pad assembly, for moving both said first label support and second label support and applicator pad assemblies from a first RETRACTED position, at which said first label support and second label support and applicator pad assemblies are disengaged from the article being conveyed along the article conveyor path, toward a second EXTENDED position, at which said second label support and applicator pad assembly will be engaged with the article being conveyed along the article conveyor path; and means disposed upon said second label support and applicator pad assembly for applying a first end portion of the single label, disposed upon said first label support and second label support and applicator pad assemblies, onto a first surface portion of the article as the article is conveyed along the article conveyor path, for wrapping an intermediate portion of the single label around a corner portion of the article as the article continues to be conveyed along the article conveyor path, and for applying a second end portion of the single label onto a second surface portion of the article as the article is conveyed still further along the article conveyor path.

2. The apparatus as set forth in claim 1, wherein said means for movably connecting said first label support and second label support and applicator pad assemblies together comprises:

hinge means for hingedly mounting said second label support and applicator pad assembly upon a first side edge portion of said first label support pad assembly.

3. The apparatus as set forth in claim 2, further comprising:

torsion spring means disposed around said hinge means and operatively connected to said first label support and said second label support and applicator pad assemblies so as to normally bias said second label support and applicator pad assembly toward a HOME position at which said second label support and applicator pad assembly is disposed substantially coplanar with respect to said first label support pad assembly and yet permits said second label support and applicator pad assembly to be moved to a deflected APPLICATION position at which said second label support and applicator pad assembly is engaged with the article being conveyed along the article conveyor path such that the label, disposed upon said first label support and second label support and applicator pad assemblies, can be applied to the first and second surface portions of the article being conveyed along the article conveyor path as the article is conveyed along the article conveyor path.

4. The apparatus as set forth in claim 3, wherein said means disposed upon said second label support and applicator pad assembly for applying the single label comprises:

applicator roller means rotatably mounted upon a second side edge portion of said second label support and applicator pad assembly for rollably applying the label onto the article being conveyed along the article conveyor path in accordance with a combination tamp/touch-contact and slidable/wipe-on application mode of operation.

5. The apparatus as set forth in claim 4, further comprising:

a housing, upon which said applicator roller means is rotatably mounted, pivotally mounted upon said second side edge portion of said second label support and applicator pad assembly so as to permit said applicator roller means to be pivotally movable with respect to said second label support and applicator pad assembly.

6. The apparatus as set forth in claim 4, wherein:

said hinge means hingedly mounts said second label support and applicator pad assembly upon said first label support pad assembly for permitting said second label support and applicator pad assembly to be moved from said HOME position, at which said second label support and applicator pad assembly is disposed substantially coplanar with respect to said first label support pad assembly, to said APPLICATION position, at which said second label support and applicator pad assembly is deflected from said coplanar state with respect to said first label support pad assembly so as to be engaged with the article being conveyed along the article conveyor path, such that the label, disposed upon said first label support and second label support and applicator pad assemblies, can be applied to a first side surface portion of the article being conveyed along the article conveyor path and a second end surface portion of the article being conveyed along the article conveyor path, which is disposed substantially perpendicular to the first side surface portion of the article being conveyed along the article conveyor path, as the article is conveyed along the article conveyor path.

7. The apparatus as set forth in claim 1, wherein:

said actuator means comprises a fluid actuator comprising an actuator cylinder and a piston rod member movable with respect to said actuator cylinder between said RETRACTED and said EXTENDED positions; and said first label support pad assembly is fixedly mounted upon a forward end portion of said piston rod.

8. The apparatus as set forth in claim 1, further comprising:

a plurality of apertures respectively defined upon front face surface portions of said first label support and second label support and applicator pad assemblies; and vacuum means fluidically connected to said plurality of apertures respectively defined upon said front face surface portions of said first label support and second label support and applicator pad assemblies for generating vacuum suction forces upon said front face surface portions of said first label support and second label support and applicator pad assemblies so as to adhere the label upon said front face surface portions of said first label support and second label support and applicator pad assemblies.

9. The apparatus as set forth in claim 8, further comprising:

label printing and dispensing means for printing a label and dispensing the same onto said front face surface portions of said first label support and second label support and applicator pad assemblies.

10. The apparatus as set forth in claim 9, further comprising:

a central processing unit (CPU) operatively connected to said label printing and dispensing means, said vacuum means, and said actuator means for coordinating the printing of a label, the dispensing and adherence of the label onto said front face surface portions of said first label support and second label support and applicator pad assemblies, and the application of the label onto the article being conveyed along the article conveyor path.

11. The apparatus as set forth in claim 10, further comprising:

photodetector means for detecting the presence of an article being conveyed along the article conveyor path and for transmitting a signal, indicative of the presence of the article being conveyed along the article conveyor path, to said central processing unit (CPU)

12. Apparatus for applying labels to different surfaces of an article being conveyed along an article conveyor path, comprising:

an article conveyor for conveying an article along an article conveyor path;

a first label support pad assembly;

a second label support and applicator pad assembly;

means for connecting said second label support and applicator pad assembly to said first label support pad assembly such that said second label support and applicator pad assembly is movable with respect to said first label support pad assembly;

said first label support and second label support and applicator pad assemblies together defining surface means for mounting a single label, to be applied to an article being conveyed along said article conveyor path, upon said first and second label applicator pad assemblies;

actuator means, connected to said first label support pad assembly, for moving both said first label support and second label support and applicator pad assemblies from a first RETRACTED position, at which said first label support and second label support and applicator pad assemblies are disengaged from the article being conveyed along said article conveyor path, toward a second EXTENDED position, at which said second label support and applicator pad assembly will be engaged with the article being conveyed along said article conveyor path; and means disposed upon said second label support and applicator pad assembly for applying a first end portion of the single label, disposed upon said first label support and second label support and applicator pad assemblies, onto a first surface portion of the article as the article is conveyed along said article conveyor path, for wrapping an intermediate portion of the single label around a corner portion of the article as the article continues to be conveyed along said article conveyor path, and for applying a second end portion of the single label onto a second surface portion of the article as the article is conveyed still further along said article conveyor path.

13. The apparatus as set forth in claim 12, wherein said means for movably connecting said first label support and second label support and applicator pad assemblies together comprises:

hinge means for hingedly mounting said second label support and applicator pad assembly upon a first side edge portion of said first label support pad assembly.

14. The apparatus as set forth in claim 13, further comprising:

torsion spring means disposed around said hinge means and operatively connected to said first label support and second label support and applicator pad assemblies so as to normally bias said second label support and applicator pad assembly toward a HOME position at which said second label support and applicator pad assembly is disposed substantially coplanar with respect to said first label support pad assembly and yet permits said second label support and applicator pad assembly to be moved to a deflected APPLICATION position at which said second label support and applicator pad assembly is engaged with the article being conveyed along said article conveyor path such that the label, disposed upon said first label support and second label support and applicator pad assemblies, can be applied to the first and second surface portions of the article being conveyed along said article conveyor path as the article is conveyed along said article conveyor path.

15. The apparatus as set forth in claim 14, wherein said means disposed upon said second label support and applicator pad assembly for applying the single label comprises:

applicator roller means rotatably mounted upon a second side edge portion of said second label support and applicator pad assembly for rollably applying the label onto the article being conveyed along the article conveyor path in accordance with a combination tamp/touch-contact and slidable/wipe-on application mode of operation.

16. The apparatus as set forth in claim 15, further comprising:

a housing, upon which said applicator roller means is rotatably mounted, pivotally mounted upon said second side edge portion of said second label support and applicator pad assembly so as to permit said applicator roller means to be pivotally movable with respect to said second label support and applicator pad assembly.

17. The apparatus as set forth in claim 15, wherein:

said hinge means hingedly mounts said second label support and applicator pad assembly upon said first label support pad assembly for permitting said second label support and applicator pad assembly to be moved from said HOME position, at which said second label support and applicator pad assembly is disposed substantially coplanar with respect to said first label support pad assembly, to said APPLICATION position, at which said second label support and applicator pad assembly is deflected from said coplanar state with respect to said first label support pad assembly so as to be engaged with the article being conveyed along said article conveyor path, such that the label, disposed upon said first label support and second label support and applicator pad assemblies, can be applied to a first side surface portion of the article being conveyed along said article conveyor path and a second end surface portion of the article being conveyed along said article conveyor path, which is disposed substantially perpendicular to the first side surface portion of the article being conveyed along said article conveyor path, as the article is conveyed along said article conveyor path.

18. The apparatus as set forth in claim 12, wherein:

said actuator means comprises a fluid actuator comprising an actuator cylinder and a piston rod member movable with respect to said actuator cylinder between said RETRACTED and said EXTENDED positions; and said first label support pad assembly is fixedly mounted upon a forward end portion of said piston rod.

19. The apparatus as set forth in claim 12, further comprising:

a plurality of apertures respectively defined upon front face surface portions of said first label support and second label support and applicator pad assemblies; and vacuum means fluidically connected to said plurality of apertures respectively defined upon said front face surface portions of said first label support and second label support and applicator pad assemblies for generating vacuum suction forces upon said front face surface portions of said first label support and second label support and applicator pad assemblies so as to adhere the label upon said front face surface portions of said first label support and second label support and applicator pad assemblies.

20. The apparatus as set forth in claim 19, further comprising:

label printing and dispensing means for printing a label and dispensing the same onto said front face surface portions of said first label support and second label support and applicator pad assemblies.

21. The apparatus as set forth in claim 20, further comprising:

a central processing unit (CPU) operatively connected to said label printing and dispensing means, said vacuum means, and said actuator means for coordinating the printing of a label, the dispensing and adherence of the label onto said front face surface portions of said first label support and second label support and applicator pad assemblies, and the application of the label onto the article being conveyed along said article conveyor path.

22. The apparatus as set forth in claim 21, further comprising:

photodetector means for detecting the presence of an article being conveyed along said article conveyor path and for transmitting a signal, indicative of the presence of the article being conveyed along said article conveyor path, to said central processing unit (CPU)

23. A method for applying labels to different surfaces of an article being conveyed along an article conveyor path, comprising the steps of:

providing a first label support pad assembly;

providing a second label support and applicator pad assembly;

connecting said second label support and applicator pad assembly to said first label support pad assembly such that said second label support and applicator pad assembly is movable with respect to said first label support pad assembly;

mounting a single label, to be applied to an article being conveyed along an article conveyor path, upon both of said first label support and second label support and applicator pad assemblies;

connecting an actuator to said first label support pad assembly; and activating said actuator so as to move both said first label support and second label support and applicator pad assemblies from a first RETRACTED position, at which said first label support and said second label support and applicator pad assembly are disengaged from the article being conveyed along the article conveyor path, to a second EXTENDED position at which said second label support and applicator pad assembly is engaged with the article being conveyed along the article conveyor path such that a first end portion of the single label, disposed upon said first label support and second label support and applicator pad assemblies, is applied onto a first surface portion of the article as the article is being conveyed along the article conveyor path, such that an intermediate portion of the single label is wrapped around a corner portion of the article as the article continues to be conveyed along the article conveyor path, and a second end portion of the single label is applied onto a second surface portion of the article as the article is conveyed still further along the article conveyor path.

24. The method as set forth in claim 23, further comprising the steps of:

providing vacuum suction forces upon front face surface portions of said first label support and second label support and applicator pad assemblies;

printing a label;

dispensing the printed label onto said front face surface portions of said first label support and second label support and applicator pad assemblies such that the label is adhered upon said front face surface portions of said first label support and second label support and applicator pad assemblies by said vacuum suction forces; and using a central processing unit (CPU) to control said provision of said vacuum suction forces upon said front face surface portions. of said first label support and second label support and applicator pad assemblies, said printing of the label, said dispensing of the label onto said front face surface portions of said first label support and second label support and applicator pad assemblies, and said actuation of said single actuator means for applying the label onto the article being conveyed along the article conveyor path.

25. The method as set forth in claim 24, further comprising the steps of:

using a photodetector to detect the presence of an article being conveyed along the article conveyor path; and transmitting a signal, indicative of the presence of the article being conveyed along the article conveyor path, to said central processing unit (CPU).

* * * * *